Jan. 4, 1966 M. L. WILKIE ETAL 3,226,837
MASTER MEASURE SYSTEM
Filed Feb. 21, 1963 5 Sheets-Sheet 1
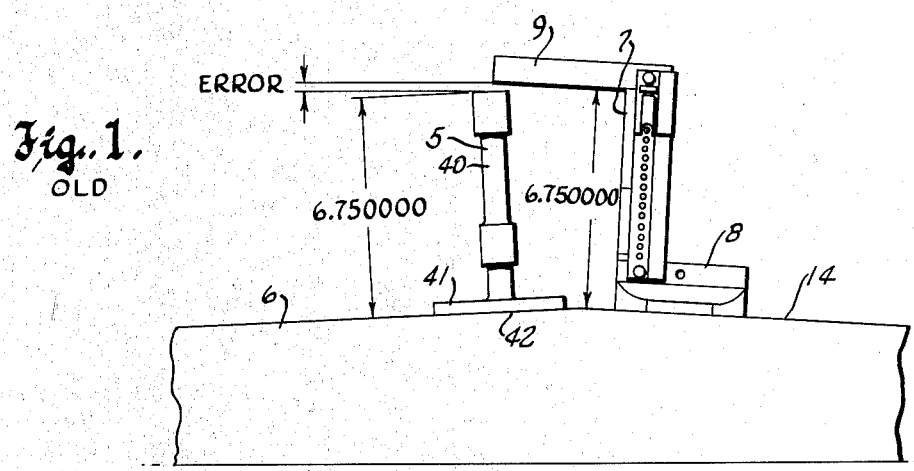
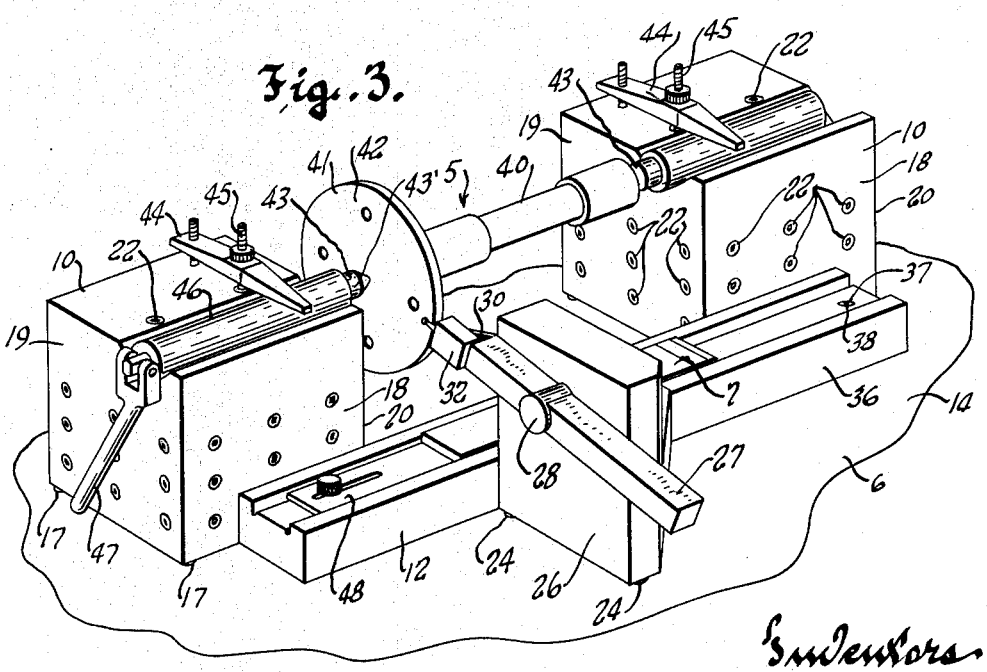
Inventors
Michael L. Wilkie
Theodore N. Busch
Casper H. Grage

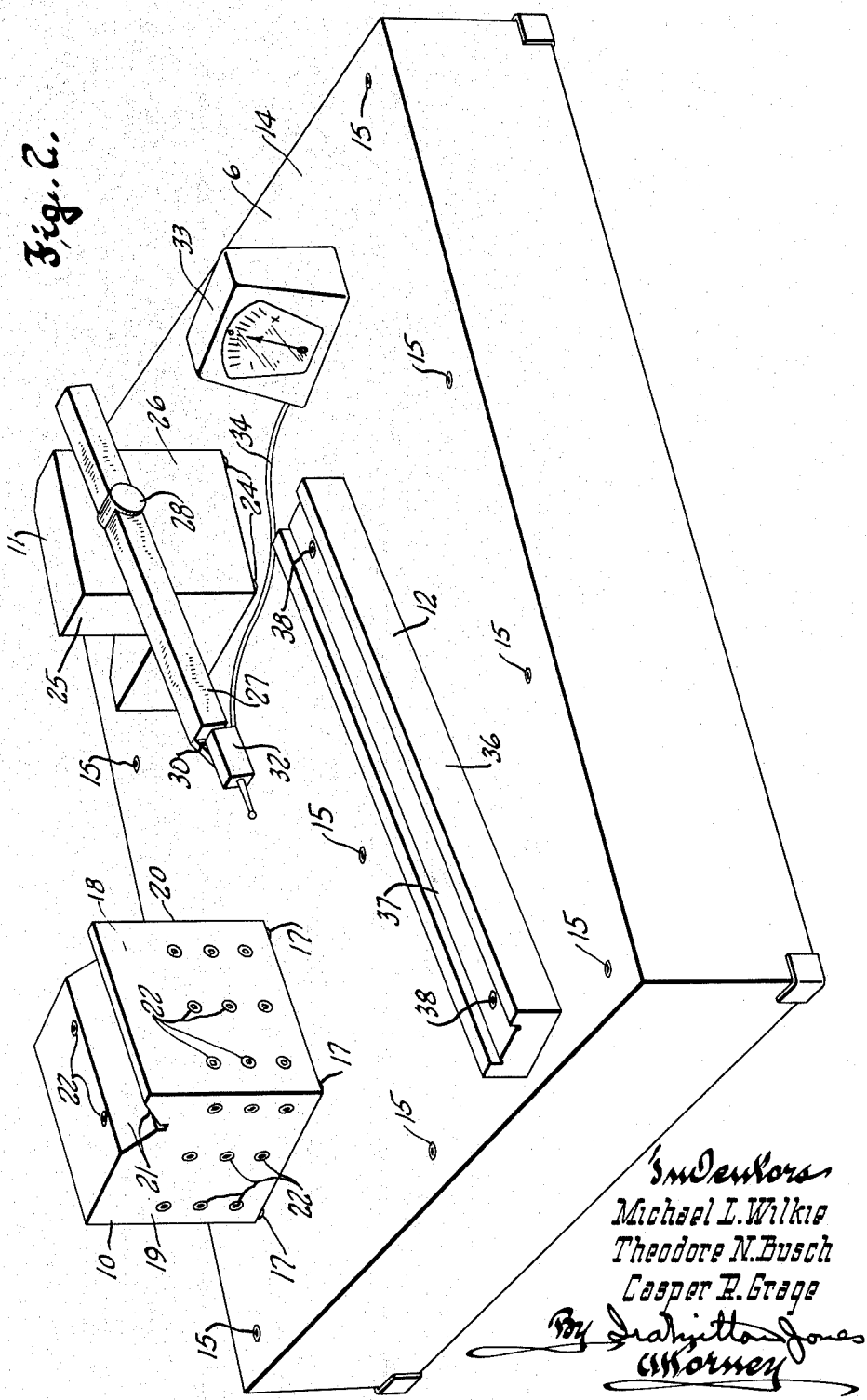

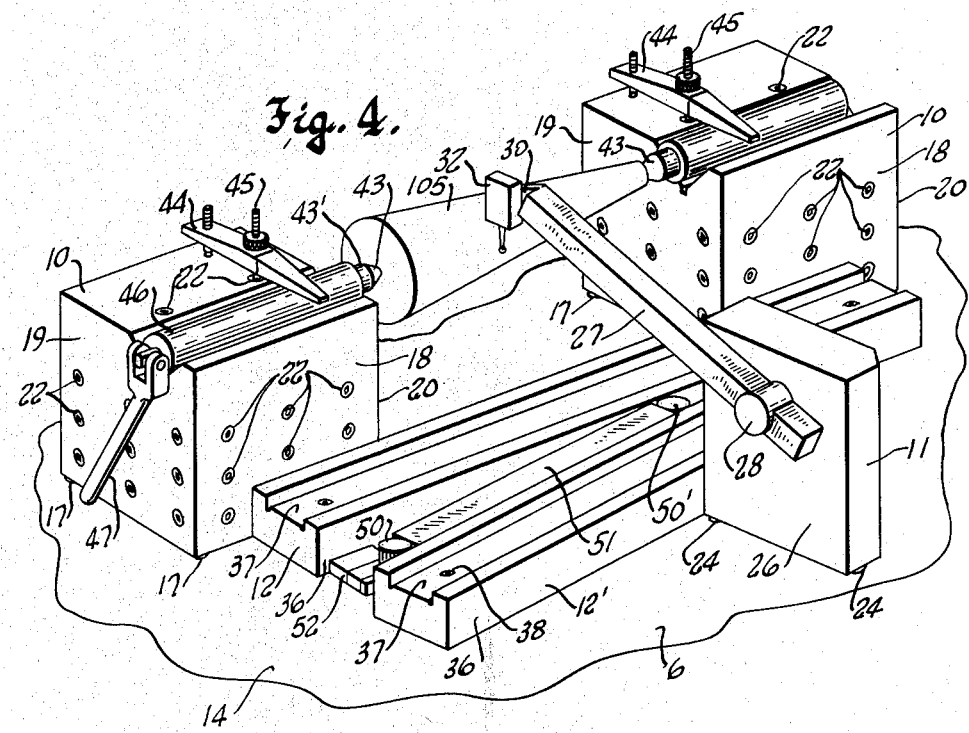
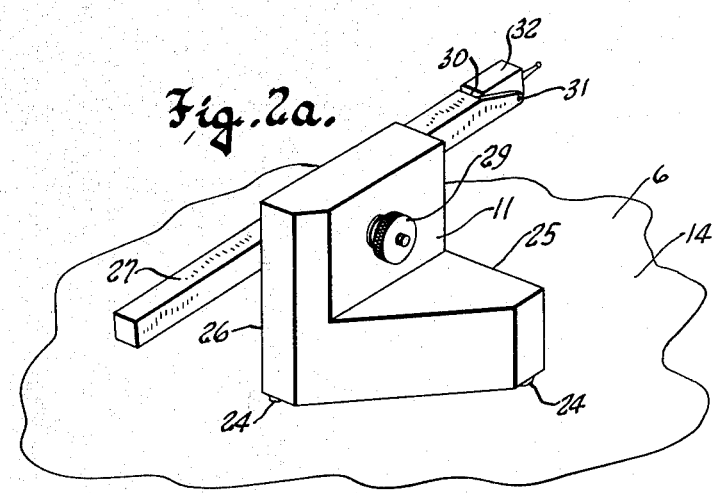

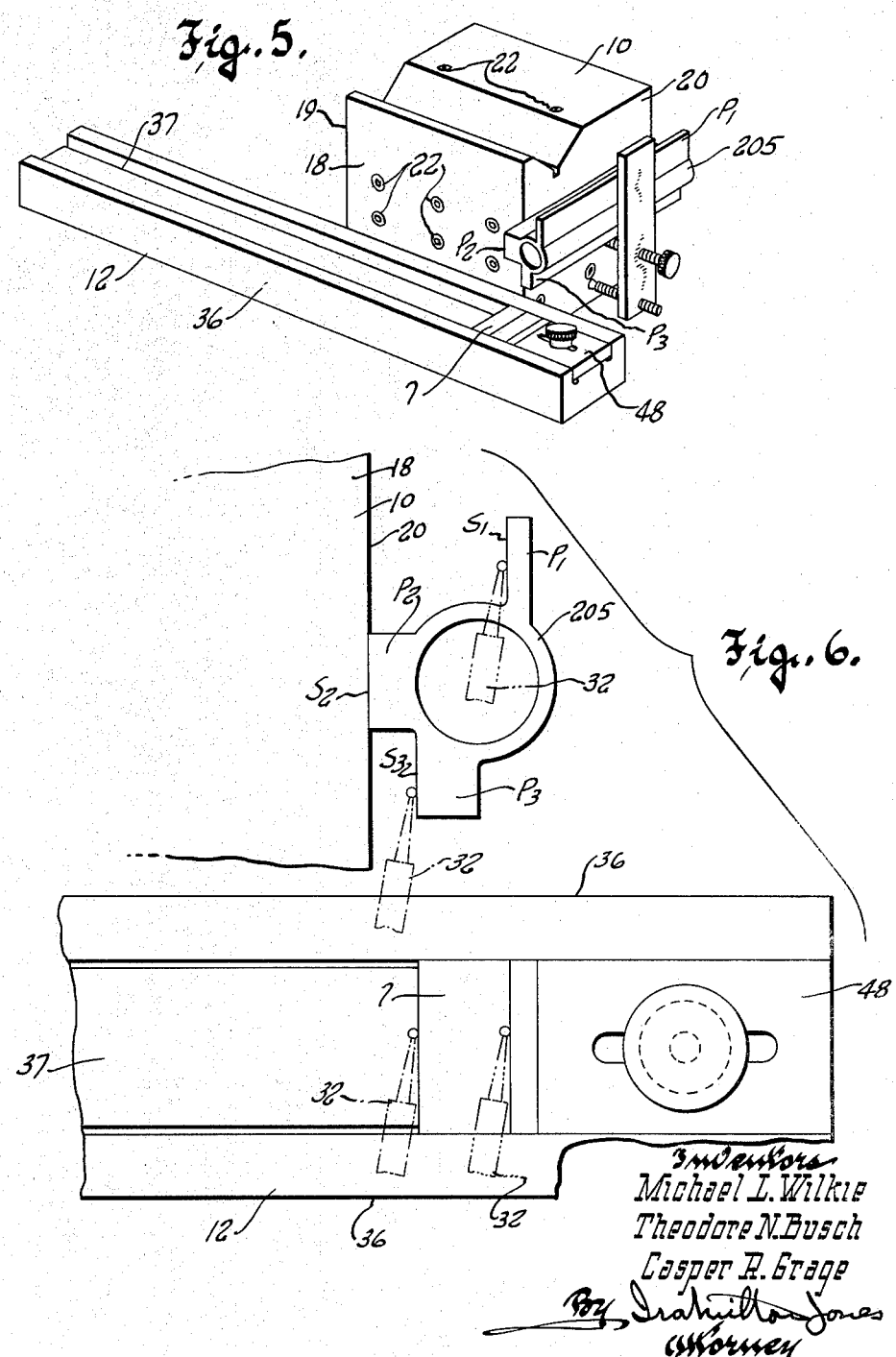

Jan. 4, 1966　　M. L. WILKIE ETAL　　3,226,837
MASTER MEASURE SYSTEM
Filed Feb. 21, 1963　　5 Sheets-Sheet 5
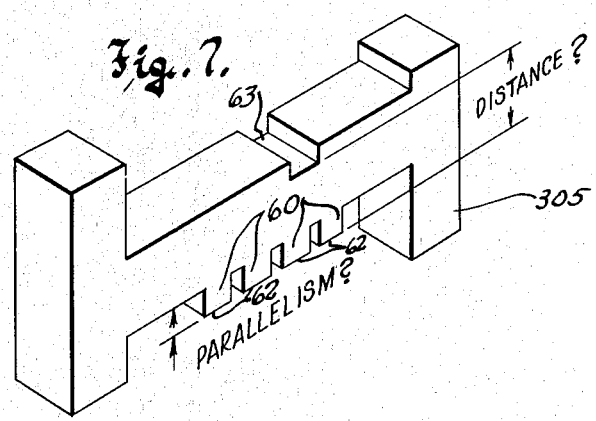
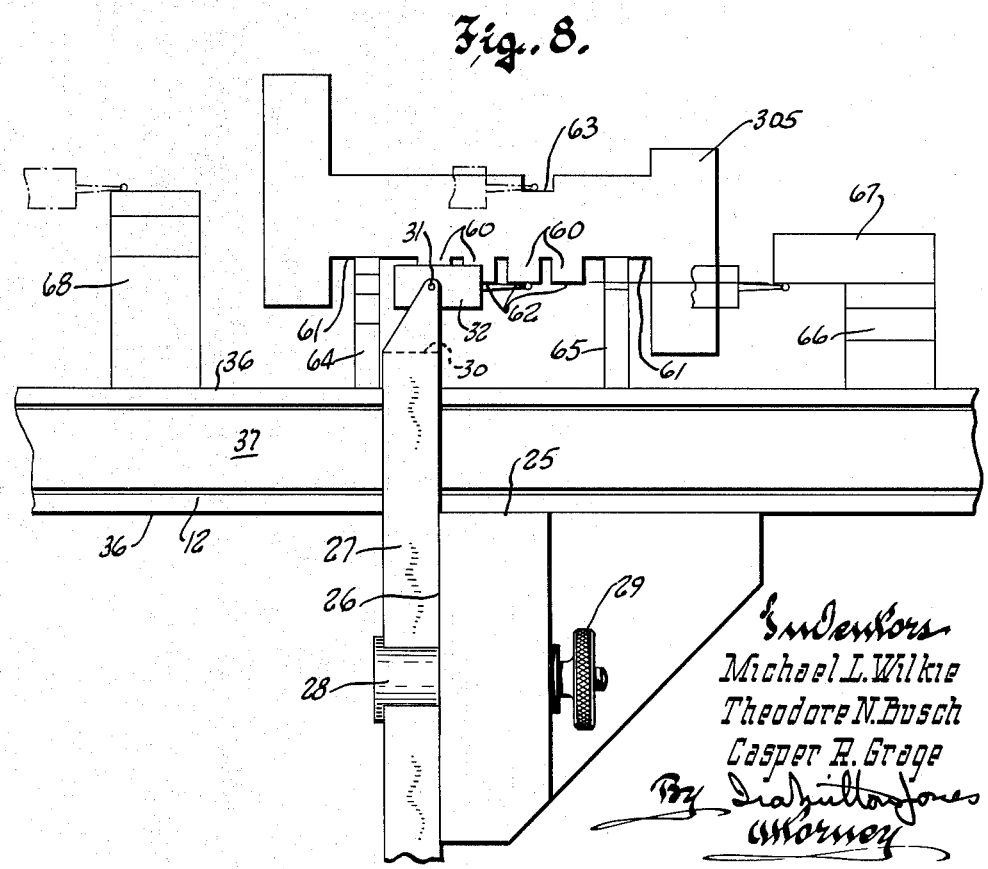
Inventors
Michael L. Wilkie
Theodore N. Busch
Casper R. Grage
By _____
Attorney

United States Patent Office 3,226,837
Patented Jan. 4, 1966

3,226,837
MASTER MEASURE SYSTEM
Michael L. Wilkie, Des Plaines, and Theodore N. Busch, Chicago, Ill., and Casper R. Grage, Escondido, Calif., assignors to The Do All Company, Des Plaines, Ill., a corporation of Illinois
Filed Feb. 21, 1963, Ser. No. 260,246
1 Claim. (Cl. 33—174)

This invention, which pertains to the general field of metrology, relates to inspection for dimensional control, and refers more particularly to gaging set ups whereby a desired relationship is established and maintained between a workpiece to be inspected, a standard such as a stack of wrung-together gage blocks, and a gage for providing information concerning variations between the workpiece and the standard.

Any dimensional inspection, or gaging operation, proceeds on the more or less tacit assumption that the workpiece being inspected is not and cannot be dimensionally perfect, and has as its objective to determine whether the dimensional imperfections in the piece are within limits that have been determined to be tolerable. This is to say that a gaging inspection is not primarily concerned with the determination of absolute quantities, but is intended to ascertain whether or not dimensions being checked are within a specified range of tolerance limits. Hence, every gaging operation consists in comparing a part or workpiece under inspection with a standard, and determining whether the part is within assigned limits of tolerance from a dimension established by that standard.

In practical dimensional control work the gage block is most commonly used as the basic standard of length. Gage blocks are sufficiently accurate, sturdy, simple and convenient for everyday use, and therefore many production gages, most master gages, and some individual production parts which are required to meet narrow tolerance limits, are checked against gage blocks.

But gage blocks in and of themselves provide nothing but a pair of parallel flat surfaces which are spaced apart by a distance that is known to be accurate within specified tolerance limits that are fine enough for practical purposes. Gage blocks can therefore serve as a standard of length, but ordinarily they cannot, by themselves, provide the information that they are used to obtain, namely the extent to which the part being checked varies from the standard defined by the gage blocks. For this purpose some type of read-out means or comparison instrumentality must be used with the gage blocks to provide the actual information toward which the gaging operation is directed.

Examples of such comparison instruments are the dial gage, the electronic comparator and the optical comparator, each of which is capable of providing quantitative information about the variation between a standard dimension as defined by gage blocks and an actual dimension being checked on a workpiece. A simpler form of gage, not intended to provide quantitative information about the extent of variation from a nominal dimension, consists of end standard blocks or caliper bars or the like, engaged against one or both of the end surfaces of a gage block stack and employed to provide "go" and "no go" information.

In the discussion that follows, gage blocks or their functional equivalent will be referred to as the standard, and the comparison instrument or other read-out means used with the standard to obtain the desired gaging or control information will be referred to by the generic designaion "gage." It will be apparent that a standard and a gage, used in cooperation with one another, comprise an inspection means.

For many gaging operations the standard, the gage and the workpiece to be checked must be established and maintained in a predetermined relationship to one another by means of complementary equipment which cooperates with the standard, the gage and the workpiece, and which together with them comprises a gaging set up. From purely theoretical considerations it will be apparent that both the accuracy and the reliability (i.e. repeatability) of gaging results are dependent upon he accuracy and reliability with which the standard, the gage and the workpiece are established and maintained in a desired relationship by a gaging set up.

In particular, the accuracy of a gaging operation is dependent upon a critical relationship between two lines, one of which may be designated as the inspection line on the workpiece, and the other of which may be designated as the reference line on the standard. The inspection line is a line which bears a fixed relation to the workpiece and on or along which lie the surfaces to which measurements are taken during the gaging operation. The reference line is a line on the standard upon which lie the points on the standard from which measurements are taken during the gaging operation.

Obviously the accuracy and reliability of a gaging operation depends upon the accuracy and reliability with which a prescribed angular relationship between the inspection and reference lines is established and maintained. Thus if the length of a shaft is to be compared with the length of a stack of wrung together gage blocks, the inspection line can be considered to be the axis of the shaft, which intersects both of the surfaces (i.e., the ends of the shaft) to which measurements are to be taken, and the reference line can be considered to be any line perpendicular to the opposite gaging surfaces of the gage block stack. For accuracy in the gaging operation the inspection and reference lines must be in exact parallelism. It is the purpose of the gaging set up used in a length gaging operation to establish and maintain that relationship.

An item of complementary equipment commonly used in gaging set ups is a surface plate, which consists simply of a block of a suitable material such as fine grained black granite having an upper surface finished to within specified narrow tolerance limits of true flatness. Heretofore in the large majority of gaging set ups in which a surface plate was employed, its finished surface was relied upon to provide ascertained congruent points on the standard and on the workpiece being checked and also to insure parallelism between the reference line and the inspection line. To this end the workpiece, standard and gage were commonly so mounted on the surface plate that the reference line intersected the finished surface of the surface plate, and in most cases the inspection line also intersected that surface.

A specific example of the use of a surface plate in a conventional prior set up is the arrangement commonly used in so-called height gaging, wherein the dimension to be checked lay along a line perpendicular to a flat surface at one end of a workpiece, and comprised the distance from that surface to another defined point at which a surface on the workpiece intersected that line. FIGURE 1 of the accompanying drawings illustrates a typical prior height gaging set up, wherein the workpiece 5 was placed on the surface plate 6 with its flat surface lowermost, engaging the finished surface of the plate. Near it on the plate 6 was placed a stack 7 of wrung-together gage blocks, comprising the standard. The lowermost block 8 of the stack was an inverted T-shaped footblock which provided stability to the stack; and to the uppermost block was wrung a laterally projecting caliper bar 9 having an accurately flat undersurface. If the caliper bar could be passed over the top of the workpiece, the workpiece was of the specified height or undersize; if it could not, the workpiece was too long.

In this set up it was assumed that accurate results were being obtained because congruent points were established by engagement of the bottom surfaces of the workpiece and gage block stack with the flat surface of the surface plate, which engagement was also supposed to insure the necessary parallelism between the reference line and the inspection line. In fact, however, the surface plate surface was flat only to within certain limits of tolerance, and the workpiece and the gage block stack could have been placed at locations on the surface plate where these tolerance limits were reached. This condition is exaggerated in FIGURE 1 for purposes of clarity. In addition, the presumably flat surfaces on the gage block stack and the workpiece likewise fell short of perfection. These imperfections and inaccuracies in the surface plate, the inspection means and the workpiece could of course be cumulative, and in cases where the height to be gaged was very long in relation to the length and width of the surfaces resting upon the surface plate, the surface inaccuracies were multiplied, due to leverage. The accumulated inaccuracies were further multiplied by a leverage factor proportional to the effective length of the caliper bar 9.

Thus each of the elements involved in the gaging set up may have been within its assigned tolerances, but the accumulation of imperfections, multiplied by the leverages, could have produced a net inaccuracy in the gaging set up that was greater than the specified tolerance limits for the workpiece being checked. Under these conditions the inspector was, all unknowingly, presented with a situation in which meaningful gaging information could not be obtained.

The present invention proceeds from an appreciation that heretofore conventional gaging set ups employing surface plates tended to be inherently inaccurate because each of them had one or more of the following unrecognized deficiences:

(1) The workpiece and the standard were so arranged that the inspection line on the workpiece and/or the reference line on the standard intersected the plane of the surface of the surface plate, but nothing in the set up provided real assurance that these two lines lay in parallel planes, and hence the angular relationship between those lines was not established with the definiteness and certainty appropriate to a gaging operation.

(2) Because the reference line and/or the inspection line intersected the plane of the surface plate surface, the arrangement tended to be top heavy and therefore somewhat unsteady, requiring the inspector to exercise considerable caution in order to avoid unreliable results.

(3) Kinematic principles were ignored, and the workpiece, standard and gage were not so constrained against relative motion, and so confined to the required relationships, that accurate and reliable results could be guaranteed.

(4) Makeshift components were frequently incorporated into the gaging set up to meet special circumstances, and these often introduced sources of error and inaccuracy which went unrecognized.

(5) The gaging set up frequently introduced a leverage factor which multiplied the inaccuracies in the standard, the workpiece and the reference surface or surfaces in the gaging set up.

With the forgeoing in mind it is the general object of this invention to provide a method of arranging a gaging set up comprising a surface plate, a standard, a gage and a workpiece, whereby the inaccuracies inherent in prior gaging set ups of this type are greatly minimized, or even eliminated, and whereby the workpiece and the standard are mounted in a convenient and inherently stable manner and are confined against motion relative to one another out of the relationship that they are required to have, thereby insuring highly reliable results without placing a premium upon the inspector's technique.

It is also an object of this invention to provide apparatus for practicing the method just referred to, and to provide gaging set ups incorporating such apparatus and embodying the practice of that method, whereby gaging inspection of numerous different kinds of workpieces is greatly facilitated and expedited, and whereby assurance is provided that the results of such inspections will be accurate and reliable.

In one of its aspects the present invention resides in the recognition that the finished surface of a surface plate used in a gaging set up can be employed as a reference plane for controlling relative motion between a gage, a standard and a workpiece, to confine those elements to purely translatory motion over the surface of the surface plate so that they can be readily brought into, and reliably maintained in, an accurately predetermined gaging relationship to one another; and more specifically in the recognition that the surface plate can be thus employed only when the workpiece and standard are so disposed thereon that the line on the workpiece along which inspection measurements are to be made and the reference line on the standard are both parallel to the finished surface of the surface plate.

With this in mind it is another and more specific object of this invention to provide a highly accurate gaging set up comprising the combination of a workpiece to be inspected, a standard, a gage, a surface plate, and certain relatively simple complementary equipment by which the workpiece can be so mounted that the line of measurement is parallel to the finished surface of the surface plate, and by which the gage and standard can be so mounted that the reference line is likewise maintained parallel to the surface plate surface and in exactly the desired relationship to the workpiece, such set up being highly versatile so as to be useful with workpieces of an almost endless variety of sizes and shapes.

It will become apparent that it is also an object of this invention to provide a gaging set up of the character described which is especially useful in inspection procedures that require a number of gaging operations, each having some specified relationship to the others, such as in checking the distances between centers of three or more holes in a workpiece, or in making angle checks where gaging must be done at two or more points on the angled surface to be inspected. This object of the invention is furthered by the provision of means in the gaging set up cooperating with the surface of the surface plate to insure that the gage is strictly confined to translatory motion in opposite directions, so that the gage is thus accurately maintained in its required relationship to the workpiece and the standard.

Another object of this invention is to provide a method and means for arranging gaging set ups whereby the labor involved in many types of dimensional inspection operations is substantially reduced, to thus bring about not only the obvious savings in time and effort but also a substantial improvement in gaging accuracy and reliability, as will be apparent from the fact that chances for error multiply with each step involved in arranging the gaging set up, each measurement that must be taken during the inspection operation, and each calculation that must be made in connection with the inspection.

Among the more specific objects of the present invention is the provision of a novel straightedge that is useful in gaging set ups of the character described and which is capable of serving as a gage block holder, a reference base member for a sine bar set up, a guide for constraining a gage to translatory movement during the course of making a series of checks at intervals along a line of inspection, and/or a means for accurately arranging a workpiece, a gage and a standard in a predetermined relationship to one another on a surface plate and for reliably maintaining them in that relationship.

With the above and other objects in view which will appear as the description proceeds, this invention resides in a novel method and means substantially as hereinafter described and more particularly defined by the appended claims, it being understood that such changes in the precise embodiments of the herein-disclosed invention may be made as come within the scope of the claims.

The accompanying drawings illustrate several complete examples of the physical embodiments of the invention constructed according to the best modes so far devised for the practical application of the principles thereof, and in which:

FIGURE 1 illustrates a typical prior height gaging set up, and is described in detail hereinabove;

FIGURE 2 is a perspective view of several items of complementary equipment useful in making gaging set ups according to the method of this invention, illustrated in combination with an electronic comparator;

FIGURE 2a shows the gage holder in perspective, as viewed from its side opposite that seen in FIGURE 2;

FIGURE 3 is a perspective view of a gaging set up embodying the principles of this invention, for checking the length of the workpiece shown in FIGURE 1, to thus obtain the same information as that sought with the set up illustrated in FIGURE 1;

FIGURE 4 is a perspective view of a gaging set up for checking an angle by means of the method and apparatus of this invention;

FIGURE 5 is a perspective view of part of another gaging set up embodying the invention, for checking the distances between offset surfaces on an oddly-shaped workpiece;

FIGURE 6 is a more or less diagrammatic view showing the successive operations in the gaging of the workpiece in the set up illustrated in FIGURE 5;

FIGURE 7 is a perspective view of a workpiece which presents special problems if it is to be checked by heretofore conventional gaging methods;

FIGURE 8 is a more or less diagrammatic view illustrating the several steps in checking the workpiece of FIGURE 7 in a gaging set up of this invention.

Referring now more particularly to the accompanying drawings, FIGURE 2 illustrates all of the complementary equipment needed for practicing the method of this invention, comprising a conventional surface plate 6, a block-like work supporting member 10, a block-like gage supporting member 11, and a straightedge 12. For greatest versatility in a kit for making gaging set ups according to this invention it is desirable to duplicate the work supporting member 10 and to provide a second straightedge, preferably similar to the straightedge 12, which is of a novel type described hereinafter. Thus a maximum of six pieces of complementary equipment, including the surface plate, will serve for almost every conceivable gaging set up for which the present invention is adapted.

Each of the units just mentioned is well adapted to be made of fine grained black granite, which has the characteristics of hardness, durability, and stability that are essential in gaging equipment.

The surface plate 6 can be in every respect conventional, comprising a block having its upper surface 14 finished to within specified tolerance limits of perfect flatness. If desired, metal inserts 15 can be fastened into wells in the surface plate by means of epoxy cement or the like to provide threaded sockets that open to the upper finished surface of the surface plate for receiving bolts by which various parts can be anchored to the plate to prevent them from sliding across it. Such sockets can be arranged in whatever pattern will afford convenience and versatility for gaging set ups, but since they are by no means essential their arrangement is not critical.

The function of each of the block-like work supporting members 10 is to define a reference plane that is perpendicular to the finished surface 14 of the surface plate and to hold the workpiece in such a position that the inspection line, along which gaging is to take place, is parallel to that finished surface and bears a predetermined angular relationship to the reference plane. The work supporting member has surface portions that define two perpendicular planes. These can be two accurately finished flat surfaces, although preferably the member is provided with feet or pads 17 at its bottom which are accurately coplanar at their undersides, so that they squarely engage the finished surface of the surface plate. One side face 18 of the workpiece supporting member is finished to flatness and is perpendicular to the plane of the feet, to define the reference plane. For convenience the member can have one or more additional side faces 19 and 20 which are finished to accurate flatness and which are mutually perpendicular to the side face 18 and to the plane defined by the feet 17, and in that event any one of the finished side faces is available to define a reference plane.

At its top the work supporting member preferably has a pair of obliquely inclined surfaces 21 that define a V-groove in which shafts and the like can be rotatably but non-translatably received. The surfaces of this groove should of course be accurately flat and should intersect along a line that is exactly parallel to one reference plane defining surface and to the plane of the feet 17. Metal inserts in the member define threaded sockets 22 that open to its finished side faces and its horizontal upper surface, and these can be used to receive bolts for holding various types of straps and clamps to the member so that variously shaped workpieces can be secured thereto, as explained more fully hereinafter.

The gage supporting member 11 also comprises a block-like element having surface portions that define a pair of mutually perpendicular planes. Again, one such plane is preferably defined by feet or pads 24 at the underside of the member, having coplanar bottom surfaces, and the other plane is defined by an accurately finished flat front face 25. If desired, one or more side faces can also be finished to be accurately flat, perpendicular to the surface plate surface, and at accurately predetermined angles to the front reference plane face 25.

The illustrated gage supporting member also has a flat side face 26, which is mutually perpendicular to its front face 25 and to the surface plate surface 14. This side face 26 serves as a guide for an indicator arm 27 which has accurately flat and parallel longitudinal side surfaces, and which is lengthwise slidable in a pivot member 28 that is mounted near the center of the side face 26, with its axis perpendicular thereto. A clamping screw 29 in the pivot member clamps the arm against the side face 26 in any desired position of sliding and swinging adjustment to which the arm may be set.

At its front end the indicator arm has a recess 30 and a screw hole 31, which provides for mounting thereon the head of an electronic comparator which cooperates with an indicating or read-out instrumentality 33 that is connected with the head 32 by means of conductors 34. Because of the flatwise engaging planar surfaces on the indicator arm 27 and the face 26 of the block-like member against which the arm is clamped, all positions to which the arm can be adjusted dispose the indicator head in a single plane that is mutually perpendicular to the plane of the surface plate and to that of the front face 25 of the gage holder, so that the gage is always in an accurate, predetermined relationship to said planes.

Obviously a dial gage or other mechanism could be installed on the indicator arm, or the gage supporting member could be provided with some form of gage mounting other than the indicator arm, so long as such mounting is capable of providing stable support for a gage and of holding the gage in an accurately predetermined relationship to the planes of the surface plate surface and of a finished upright surface on the gage supporting member.

In many cases, particularly where small parts are to be gaged, the straightedge or straightedges needed for a gaging set up embodying the principles of this invention can be provided by one or more accurately finished side surfaces on the surface plate itself. Desirably, however, there should be available at least one, and preferably two, straightedges having the novel form of the straightedge 12 illustrated in FIGURE 2 which can serve as a gage block holder. The straightedge 12 is an elongated member of fine grained black granite or the like having an accurately flat bottom surface and accurately flat side faces 36 that are parallel to one another and perpendicular to the bottom face. Opening to the top of the straightedge is a groove or slot 37 in which gage blocks are adapted to be received with a close sliding fit. When inserted into this groove, a stack of wrung-together gage blocks will have their end gaging faces exactly perpendicular to the finished surface of the surface plate and to the side faces 36 of the straightedge, and it will be noted that the accuracy of this relationship tends to increase with increasing length of the gage block stack, as is desirable, unlike the situation that obtains when a gage block stack is built upwardly from a surface plate surface and inaccuracies multiply in proportion to the height of the stack. The straightedge can also have inserts defining threaded sockets 38 that open upwardly to the bottom of the gage block slot 37.

Cooperating with the units of complementary equipment illustrated in FIGURE 2 are various clamping arms and the like, adapted to be fastened by means of bolts received in the threaded inserts. Such clamping arms need not have any particular form or shape, as will become apparent as the description proceeds, because the desired relationship between workpiece, gage and standard is established by cooperation between the finished surfaces of the several pieces of complementary equipment comprising the gaging set up; hence clamping arms and the like can, if necessary, be easily improvised to meet the specific requirements of each gaging problem without jeopardizing the accuracy or stability of the gaging set up.

The several gaging set ups shown in FIGURES 3–9 illustrate the application of the principles of the present invention to specific gaging problems. In each case the set up embodies the following general principles:

(1) The workpiece is confined against translatory motion relative to a member having a surface accurately perpendicular to the finished surface of the surface plate— usually one or both of the block-like workpiece supporting members 10.

(2) As thus confined, the workpiece is so disposed that the line along which gaging is to be done (the inspection line) is parallel to the finished surface of the surface plate and bears a predetermined angular relationship to the reference plane on the member against which the workpiece is confined.

(3) The standard is so arranged that the reference points thereon lie along a straight line (the reference line) that is parallel to the surface of the surface plate.

(4) The gage is supported on a block-like gage supporting member having a surface accurately perpendicular to the finished surface of the surface plate, and is so secured to said member as to be disposed in predetermined relationship to the finished surfaces thereon.

(5) Finished surfaces on complementary equipment elements incorporated into the particular gaging set up are utilized in establishing and maintaining the desired gaging relationship between the workpiece, the standard and the gage.

(6) Where the gaging operation requires relative translation between the workpiece and the inspection means, the surface of the surface plate is employed for guidance in one plane, and the upright finished surfaces on the complementary equipment in the set up are used to further constrain such motion to pure translation.

The gaging set up illustrated in FIGURE 3 is intended for obtaining the same information as that obtained by means of the old set up shown in FIGURE 1, to wit: whether or not the workpiece 5 (which is the same as that shown in FIGURE 1) has a length that is within specified tolerance limits of a prescribed value. Comparison of FIGURES 1 and 3 will thus facilitate an understanding of how the present invention differs from what has gone before.

The workpiece can be considered to comprise a shaft 40 having a flange portion 41 at one end thereof on which there is an axially outwardly facing surface 42 that is presumed to be flat and accurately perpendicular to the shaft axis. Since the gaging inspection is to take place along a line of measurement which coincides with or is parallel to the shaft axis, to determine the distance between two points on that line, the workpiece must be arranged, in accordance with the principles of this invention, with its axis parallel to the surface 14 of the surface plate.

To this end an accurate center 43, having a coaxial pointed end portion but otherwise untapered, is placed in the V-groove of each of a pair of workpiece supporting members 10. A suitable clamping arm 44, secured by a pair of bolts 45 engaged in threaded sockets 22 opening to the top surface of the work supporting member, projects over the center 43 to clampingly confine it against axial shifting in the V-groove. The shape of the arm 44 is in no wise critical, since it merely holds the center in the groove. The pointed ends of the centers are engaged against the opposite ends of the workpiece, on the axis thereof, and the front reference plane defining surfaces 18 of the two work supporting members are engaged against the rear side face of a straightedge 12 to insure accurate coaxial alignment of the centers, thus establishing the workpiece with its axis parallel to the surface plate surface 14 and to the vertical reference plane defined by the surfaces 18.

To facilitate making the set up, one of the centers can comprise an inner center member 43' which is axially slidable in an outer tubular member 46, spring loaded to project its pointed end towards the workpiece and retractable by a suitable manually operable mechanism 47, or other means may be provided for holding the inner member in a desired position of axial adjustment relative to the outer tubular member.

A stack 7 of wrung together gage blocks, totaling the prescribed length of the workpiece, is placed in a groove 37 in the straightedge, thus automatically assuring that a line perpendicular to the end gaging surfaces of the gage block stack (i.e. the reference line) is exactly parallel to the line along which gaging measurement is to be made.

Now the gage supporting member 11 of this invention has its front reference surface 25 engaged against the front surface 36 of the straightedge, and the indicator arm is adjusted to engage the end surface 42 on the workpiece. The gage supporting member is confined to translatory motion parallel to the line of measurement by the straightedge and the surface plate, and the gage can therefore be adjusted by translation of the supporting member until the gage yields some desired reading such as zero. Now, without moving the gage supporting member, the indicator arm 27 is swung downwardly, to dispose the indicator head in the gage block slot 37 of the straightedge, and the gage block stack is moved to bring its adjacent gaging end surface into engagement with the indicator head and to a position at which a zero reading is again produced. Since the gaging head has been swung in a plane that is exactly perpendicular to the line of measurement, exact congruence has thus been attained between one gaging surface on the gage block stack and the end surface 42 on the workpiece. If desired, a slotted end stop 48, secured by a bolt received in a threaded socket 38 in the straightedge, can be used to define the proper position of the gage block stack when such congruence has been attained.

Now the gage supporting member can be moved down to the other end of the workpiece, with its front reference surface 25 again engaging the front surface 36 of the straightedge so that adjusting movement of the indicator arm always disposes the head in a plane which is exactly perpendicular to the axis of the workpiece. Hence the arm can be swung down to carry the head into the gage block slot of the straightedge, so that the comparator can be zeroed on the other gaging surface of the gage block stack, and the head can then be swung up to engage the workpiece and provide a direct reading of the difference if any between the lengths of the gage block stack and of the workpiece.

Those skilled in the art will recognize that the above described procedure, while capable of producing accurate and reliable results, may be somewhat clumsy as compared with the old method of height gaging. However, it should be noted that the use of an electronic comparator in the inspection operation just described is merely illustrative; in actual practice the operation could be performed with substantially greater accuracy and facility if an optical comparator were used, and in that case the set up illustrated in FIGURE 3 would be in all respect superior to that illustrated in FIGURE 1.

But even with an electronic comparator the above described set up and procedure might have very substantial advantages over height gaging in the event additional gaging operations must be performed upon the workpiece, as would most likely be the case. For example, it will be immediately apparent that the set up illustrated in FIGURE 3 lends itself nicely to the checking of the shaft portion of the workpiece for concentricity and for accuracy of diameter at various stations along its length. Similarly it becomes an easy matter to check the surface 42 on the flange portion of the workpiece for flatness and for perpendicularity to the axis of the piece, in a manner which will be evident to those skilled in the art, without making any change in the basic set up.

In the sine bar set ups heretofore conventionally employed, a stack of gage blocks was mounted upright on a surface plate, and a sine bar was so arranged that the cylinder at one end of it rested directly on the surface plate. The angle standard was thus defined by the inclination of the sine bar to the surface of the surface plate, and was assumed to lie in a plane perpendicular to the surface plate surface. The reference line lay along the upper surface of the sine bar, and therefore of course intersected the plane of the surface plate surface. In many cases the workpiece was mounted on the sine bar, with one of its angled faces resting on the top surface of the sine bar and its other angled surface uppermost and in a position to be checked, by means of a dial gage or electronic comparator, for parallelism with the surface plate surface.

One disadvantage of such a set up was its inherent top heaviness and instability, and another disadvantage, perhaps more frequently recognized, was the necessity for improvising means for holding the workpiece in place on the sine bar. Some sine bar set ups, such as those conventionally used in checking bevel gears, also left open the possibility that the inspection line on the workpiece might not be disposed in exactly the same vertical plane as the reference line on the standard, so that gaging results were not reliable.

A gaging set up for angle checking, embodying the principles of the present invention, is illustrated in FIGURE 4, wherein the workpiece 105 is shown, for simplicity of illustration, as comprising a conical element, and the gaging operation is intended to check the angle between its axis and a line along its side surface that is defined by a plane lying on its axis—in short, the taper angle of the workpiece. The workpiece 105 is mounted on centers secured in the V-grooves of a pair of work supporting members, exactly as in the set up illustrated in FIGURE 3, and again a straightedge 12 is engaged with the front reference plane surfaces 18 of the work supporting members to insure coaxial alignment of the centers. The straightedge 12 is used as the base for a sine bar arrangement which is similar to that heretofore conventional, except that the entire arrangement is in effect laid on its side. The sine bar itself, however, can comprise a second straightedge 12', of the type hereinabove described, used in conjunction with a pair of cylinders 50 and 50', a spacer bar 51 which maintains a precise distance between the cylinders, and a stack 52 of wrung together gage blocks, the total length of which is a trigonometric function of the angle standard to be established and the center-to-center distance between the cylinders 50 and 50' maintained by the spacer bar 51. The spacer bar is of course in flatwise contact with the rear side face of the straightedge 12', its ends are inwardly of the ends of that straightedge, and the cylinders 50 and 50' are in contact with the ends of the spacer bar and with the rear face of the straightedge 12'. The gage block stack has one gaging surface in contact with the front face of the straightedge 12 and its other gaging surface in contact with one of the cylinders 50. The other cylinder 50' is in direct contact with the front face of the straightedge 12.

It will be apparent that the workpiece can now be checked by translating the gage supporting member over the surface of the surface plate, with the front face 25 of the gage supporting member in contact with the front face of the straightedge 12' that comprises the angle standard. Any variation between the angle to be checked and that defined by the standard will of course be manifested in a change in the reading on the gage as it is moved from one end of the workpiece to the other. It will be understood that the comparator head will have been set to have the tip of its feeler at a height equal to the height of the axis of the centers above the surface plate surface, as can be done quite readily by direct checking before the workpiece is installed between the centers; and in this way assurance will be had that the line of inspection, along which the gage contacts the workpiece, lies in a plane which is exactly parallel to the surface plate surface and which is on the axis of the workpiece.

It will be noted that with the FIGURE 4 set up a concentricity check can be performed almost simultaneously with the angle check, at any desired point along the length of the workpiece, merely by rotating the workpiece when the gage is in contact with it at that point and observing any change in the reading on the gage as the workpiece is rotated.

The workpiece 205 shown in FIGURES 5 and 6 is a tubular member having flange-like projections $P_1$, $P_2$ and $P_3$ which define three parallel surfaces $S_1$, $S_2$ and $S_3$ that all face in the same direction. Because of the projection $P_2$ intervenes between projections $P_1$ and $P_3$, direct measurement of the distance between the planes of surfaces $P_1$ and $P_3$ was not feasible with many prior gaging set-ups, and it was therefore necessary to take a measurement from $S_1$ to $S_2$ and another from $S_2$ to $S_3$, arriving at the final result by arithmetic.

Utilizing the principles of the present invention, the workpiece is clamped against a work supporting member, with the surface $S_2$ on the workpiece flatwise engaged against a side surface 20 on the supporting member, and with the workpiece projecting some distance beyond the front surface 18 of the member. Thus the line along which the distance $S_1$–$S_2$ is to be measured—i.e., the line of measurement—is disposed parallel to the surface of the surface plate. A gage block stack of a length equal to the specified distance between the surfaces $S_1$ and $S_3$ is placed in a straightedge 12, and the rear surface of the latter is flatwise engaged against the front upright surface on the work suporting member. From FIGURE 6, which is a diagrammatic or composite view, with the workpiece shown in front elevation and the straightedge shown in plan view, the steps in the gaging operation itself will be clear, the procedure being exactly the same as in a length gaging operation with the set up shown in FIGURE 3. It will be apparent that the gaging operation can readily include a direct check of the distance between the planes of surfaces $S_1$ and $S_2$ and/or surfaces $S_2$ and $S_3$, which is facilitated by having the workpiece extend forwardly of the front face of the work supporting member where the surface $S_2$ is accessible to the comparator head.

The workpiece 305 illustrated in FIGURE 7 would provide an especially difficult problem in checking by prior methods. At its bottom it has a number of toothlike protuberances 60 that project below its coplanar main bottom surfaces 61, and the bottom surfaces 62 of these protuberances are required to be coplanar with one another and parallel to the plane of bottom surfaces 61. A notch 63 opening to its top surface is required to have its bottom at a specified distance from the plane of the bottom surfaces 62 of the protuberances.

Two stacks 64 and 65 of gage blocks, of equal but arbitrarily selected total lengths, are wrung together and laid on their sides on the surface plate, each with one of its gaging faces engaged against one of the bottom surfaces 61 on the workpiece and its other gaging surface flatwise engaged against the rear upright surface of a straightedge 12. The coplanar surfaces 61 are now exactly parallel to the side surfaces of the straightedge, and if desired a clamp can be engaged with the workpiece and straightedge to hold them assembled with the gage block stacks 64 and 65. At one side of the workpiece another gage block stack 66 is laid on the surface plate, with one gaging surface flatwise engaging the rear surface of the straightedge. The stack 66 defines a length which is shorter than the stacks 64 and 65 by an amount equal to the height of the protuberances 60, i.e., the distance between the planes of surfaces 61 and 62. To the other of the gaging surfaces of the stack 66 is wrung a caliper bar 67 or the like, to provide a surface against which the comparator head can be zeroed. The front reference surface of the gage supporting member is maintained in engagement with the front upright surface of the straightedge, and the gage is thus constrained to translatory motion exactly parallel to the reference surface provided by the caliper bar, to enable parallelism and dimensional accuracy of the bottom surfaces 62 of the protuberances to be checked.

Another gage block stack 68 is placed alongside the workpiece with one of its gaging surfaces in flatwise engagement with the rear surface of the straightedge. The length of stack 68 is greater than that of stacks 64 and 65 by an amount equal to the specified distance between the bottom of the notch 63 and the plane of the bottom protuberance surfaces 61. It will be evident that this distance on the workpiece can be checked by zeroing the comparator head on the stack 68, with the gage block support engaged against the front surface of the straightedge, and then moving the gage to a position where the comparator head can be engaged against the bottom of the notch 63, with the front face of the gage supporting member again engaging the front surface of the straightedge.

From the foregoing description taken together with the accompanying drawings it will be apparent that the present invention provides a gaging set up which is adaptable to amost every gaging problem, which can be very quickly and easily arranged, and which tends to insure very accurate and reliable results. It will also be apparent that the principal elements required in gaging set ups of the present invention are relatively few in number, and simple and therefore relatively inexpensive, and provide the utmost versatility in the arrangement of gaging set ups while eliminating the need for improvised and makeshift equipment.

What is claimed as our invention is:

Set up means for accurately establishing and maintaining a predetermined relationship between a workpiece on which gaging is to be done along a predetermined inspection line and inspection means comprising gage block means having opposite parallel surfaces spaced apart by an accurately predetermined distance to provide a standard and a gage for providing information concerning variation between the workpiece and the standard, said set up means comprising the combination of:

(A) a surface plate having an accurately finished flat surface;

(B) a block-like workpiece confining member
 (1) having surface portions which lie in and define a pair of perpendicular planes, the surface portions that define one of said planes being adapted to rest on said surface of the surface plate so that the others of said surface portions define a reference plane which is perpendicular to said surface,
 (2) and having means thereon for confining a workpiece in a predetermined relationship thereto such that the inspection line on the workpiece is parallel to the surface of the surface plate and bears a known angular relationship to the reference plane;

(C) a block-like gage supporting member
 (1) having surface portions which lie in and define a pair of mutually perpendicular planes, the surface portions that define one of said planes being adapted to rest on said surface of the surface plate so that the others of said surface portions define a translation plane perpendicular to said surface, and
 (2) having means thereon for supporting a gage in a predetermined disposition relative to said surface portions thereon;

(D) means on the surface plate for establishing a predetermined relationship between the workpiece, the standard and the gage such that the inspection line, a line perpendicular to said opposite faces of the gage block means, and a line on the translation plane parallel to said surface bear predetermined angular relationships to one another, said means comprising a straightedge having accurately flat bottom surface adapted to engage said surface of the surface plate, elongated parallel side surfaces that are perpendicular to said bottom surface, and a lengthwise extending groove opening upwardly to its top face in which gage blocks are receivable and by which they are held with their gaging end faces accurately perpendicular to said side surfaces of the straightedge and to said surface of the surface plate.

References Cited by the Examiner

UNITED STATES PATENTS 2,504,961  4/1950  Braaten _____ 33—174
2,858,616  11/1958  Swanson _____ 33—174

ISAAC LISANN, *Primary Examiner.*

SAMUEL S. MATTHEWS, *Examiner.*